United States Patent
Wang

(10) Patent No.: US 11,036,536 B2
(45) Date of Patent: Jun. 15, 2021

(54) METHOD, APPARATUS, AND SYSTEM FOR DEPLOYING VIRTUALIZED NETWORK FUNCTION USING NETWORK EDGE COMPUTING

(71) Applicant: HUAWEI TECHNOLOGIES CO., LTD., Guangdong (CN)

(72) Inventor: Hua Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/233,918

(22) Filed: Dec. 27, 2018

(65) Prior Publication Data

US 2019/0129745 A1    May 2, 2019

Related U.S. Application Data

(63) Continuation of application No. PCT/CN2017/087234, filed on Jun. 6, 2017.

(30) Foreign Application Priority Data

Jun. 27, 2016  (CN) .................. 201610481799.X

(51) Int. Cl.
*G06F 9/455* (2018.01)
*H04L 12/24* (2006.01)

(52) U.S. Cl.
CPC ...... *G06F 9/45558* (2013.01); *H04L 41/0806* (2013.01); *G06F 2009/4557* (2013.01);
(Continued)

(58) Field of Classification Search
CPC .................................................. G06F 9/45533
(Continued)

(56) References Cited

U.S. PATENT DOCUMENTS 9,967,745 B2 *  5/2018  Marquardt .............. H04L 67/14
10,348,517 B2 *  7/2019  McNamee .............. H04L 63/06
(Continued)

FOREIGN PATENT DOCUMENTS

CN          1985240 A        6/2007
CN         104580208 A       4/2015
(Continued)

OTHER PUBLICATIONS

"Network Functions Virtualisation (NFV); Architectural Framework", ETSI GS NFV 002 V1.2.1 (Dec. 2014), 21 pages.
(Continued)

*Primary Examiner* — Andy Ho

(57) ABSTRACT

A method, an apparatus, and a system for deploying a VNF using NEC are provided. The method is as follows: After receiving first location information sent by a user terminal, a central VNFC sends, to a VNFM, a creation request message that is used to create an edge VNFC, where the creation request message carries the first location information. After receiving the creation request message, the VNFM sends, to a VIM, a first request message that is used to create a virtual machine or a container of the edge VNFC, where the first request message carries the first location information and a mirror of the edge VNFC. In this way, it can be implemented that a deployment location of the edge VNFC is proximate to a user in a NEC scenario, thereby reducing a service delay and improving quality of service.

16 Claims, 10 Drawing Sheets

(52) U.S. Cl.
CPC .............. *G06F 2009/45562* (2013.01); *G06F 2009/45595* (2013.01)

(58) Field of Classification Search
USPC ............................................................ 718/1
See application file for complete search history.

(56) References Cited

U.S. PATENT DOCUMENTS

| | | | |
|---|---|---|---|
| 10,348,825 B2* | 7/2019 | Rao | H04L 63/029 |
| 2006/0015849 A1 | 1/2006 | Polozoff | |
| 2014/0201374 A1 | 7/2014 | Ashwood-Smith et al. | |
| 2017/0238238 A1 | 8/2017 | Hasegawa et al. | |
| 2017/0302646 A1 | 10/2017 | Wang et al. | |
| 2018/0192330 A1 | 7/2018 | Yamasaki et al. | |
| 2018/0349203 A1 | 12/2018 | Ohta et al. | |
| 2018/0351824 A1* | 12/2018 | Giust | H04L 67/10 |
| 2019/0182761 A1 | 6/2019 | Kuge et al. | |
| 2019/0387062 A1* | 12/2019 | Enat | H04L 67/148 |

FOREIGN PATENT DOCUMENTS

| | | |
|---|---|---|
| CN | 105490908 A | 4/2016 |
| CN | 105634780 A | 6/2016 |
| CN | 105975330 A | 9/2016 |
| JP | 5046161 B2 | 10/2012 |
| JP | 2016009486 A | 1/2016 |
| KR | 20150105421 A | 9/2015 |
| WO | 2015135611 A1 | 9/2015 |
| WO | 2016056321 A1 | 4/2016 |
| WO | 2016084135 A1 | 6/2016 |
| WO | 2017002735 A1 | 1/2017 |
| WO | 2017094246 A1 | 6/2017 |

OTHER PUBLICATIONS

Chinese Office Action dated Aug. 28, 2018 from Chinese Patent Application No. 201610481799.X, 6 pages.
International Search Report and Written Opinion of the International Searching Authority dated Sep. 6, 2017, from International Patent Application No. PCT/CN2017/087234, 14 pages.
Office Action issued in Japanese Application No. 2019-520190 dated Nov. 5, 2019, 8 pages (with English translation).
Callegati et al., "Dynamic Chaining of Virtual Network Functions in Cloud-Based Edge Networks," Proceedings of the 2015 1st IEEE Conference on Network Softwarization (NetSoft), Apr. 2015, 6 pages.
ETSI, "Network Function Virtualization (NFV) Management and Orchestration," GS NFV-MAN 001 V0.6.3; Group Specification, Sep. 2014, 198 pages.
Extended European Search Report issued in European Application No. 17819046.8 dated May 14, 2019, 9 pages.
Nakagawa et al., "Dynamic Virtual Network Configuration between Containers using Physical Switch Functions for NFV Infrastructure," 2015 IEEE Conference on Network Function Virtualization and Software Defined Network (NFV-SDN), Nov. 2015, 8 pages.
Office Action issued in Korean Application No. 10-2019-7001656 dated Mar. 4, 2020, 8 pages (With English Translation).
International Search Report dated Sep. 6, 2017 in corresponding International Patent Application No. PCT/CN2017/087234.
ETSI GS NFV-MAN 001 V1.1.1 (Dec. 2014),Network Functions Virtualisation (NFV); Management and Orchestration (184 pages).
Notice of Allowance in corresponding Korean Application No. 10-2019-7001656 dated Sep. 14, 2020.

* cited by examiner

METHOD, APPARATUS, AND SYSTEM FOR DEPLOYING VIRTUALIZED NETWORK FUNCTION USING NETWORK EDGE COMPUTING

CROSS-REFERENCE TO RELATED APPLICATIONS

This application is a continuation of International Application No. PCT/CN2017/087234, filed on Jun. 6, 2017, which claims priority to Chinese Patent Application No. 201610481799.X, filed on Jun. 27, 2016, The disclosures of the aforementioned applications are hereby incorporated by reference in their entireties.

TECHNICAL FIELD

The present disclosure relates to the field of data communications technologies, and in particular, to a method, an apparatus, and a system for deploying a virtualized network function using network edge computing.

BACKGROUND

A network function virtualization (NFV) technology is used to migrate a function of each network element used in a telecommunications network from a current dedicated hardware platform to a universal commercial-off-the-shelf (COTS) server, and virtualize the function as a virtualized network function (virtualized network function, VNF). Theoretically, the NFV may be flexibly deployed on a uniform infrastructure platform constructed based on other devices such as a standard server, memory, and switch, and resource pooling and virtualization are performed on an infrastructure hardware device by using a virtualization technology, to provide a virtual resource for an upper-layer application and decouple the application from hardware, so that virtual resources can be quickly added to each application to quickly increase a system capacity, or virtual resources can be quickly reduced to decrease a system capacity, greatly improving network flexibility. The universal COTS server is used to constitute a shared resource pool. For a newly developed service, no hardware device needs to be deployed separately, greatly shortening go-online time of the new service.

With an increasingly high requirement for service experience of a user, and in particular, with emerging of new experience technologies such as video enhancement and virtual reality, there is an increasingly high requirement for a network delay. However, currently, a network application service is generally deployed in a centralized data center, and is far from the user, and a network path needs to pass through several routers, switches, and the like. Consequently, a network delay is relatively large, and a low-delay requirement of the foregoing service cannot be met. In addition, the foregoing new service requires extremely high network bandwidth, and consequently there is certainly a requirement for enough high network bandwidth between the user and the data center, thereby increasing network deployment costs.

Network edge computing (Network edge computing, NEC) refers to deploying a service function on a device that is closest to the user and that has a specific computing capability, such as a home gateway or a base station controller. By using the NEC technology, a delay can be greatly reduced, backbone network bandwidth can be reduced, and the service experience of the user can be improved.

Therefore, it is an inevitable tendency to combine the NFV and NEC technologies. Requirements of the NEC for an NFV architecture include: (1) Massive edge devices need to be managed in a unified manner; (2) several virtualized network function components (Virtualized Network Function Component, VNFC) are deployed on each edge device; (3) the VNFCs on the edge device are quickly created and removed; and (4) a specific deployment location of a VNFC is required to be closest to the user.

However, the current NFV technology is mainly oriented to a scenario of the centralized data center, and does not consider a NEC scenario. Consequently, the foregoing requirements of the NEC for the NFV cannot be met, and in particular, the requirement that the specific deployment location of the VNFC is required to be closest to the user cannot be met. Currently, deploying the VNFC by the NFV is analyzed by using a resource dimension, to be specific, the VNFC is deployed on a server that meets a resource requirement of the VNFC and that most satisfies a resource allocation policy, and a location being closest to the user is not considered.

Therefore, a VNF deployment solution in the NEC scenario is urgently required, to reduce a service delay and improve quality of service of a business.

SUMMARY

Embodiments of the present invention provide a method, an apparatus, and a system for deploying a VNF using NEC, to reduce a service delay and improve quality of service.

Specific technical solutions provided in the embodiments of the present invention are as follows:

According to a first aspect, a method for deploying a virtualized network function using network edge computing is provided, and the method includes:

receiving, by a central VNFC, first location information sent by a user terminal; and sending, by the central VNFC to a VNFM, a creation request message that is used to create an edge VNFC, to execute a deployment process of the edge VNFC, where the creation request message carries the first location information, the virtualized network function is completed by using the central VNFC and the edge VNFC, and the edge VNFC is configured based on the first location information.

In this way, it can be implemented that a deployment of the edge VNFC is proximate to a user in a NEC scenario, reducing a service delay and improving quality of service of a business.

With reference to the first aspect, in a possible design, after the sending, by the central VNFC to a VNFM, a creation request message that is used to create an edge VNFC, the method further includes:

receiving, by the central VNFC, a service registration request message sent by the deployed edge VNFC, where the edge VNFC is configured based on the first location information; and sending, by the central VNFC, service configuration information and user terminal information to the edge VNFC, and providing a business service of the virtualized network function for the user terminal by using the edge VNFC.

With reference to the first aspect, in a possible design, after the sending, by the central VNFC, service configuration information and user terminal information to the edge VNFC, the method further includes:

when location information of the user terminal changes, receiving, by the central VNFC, second location information sent by the user terminal; and sending, by the central VNFC to the VNFM, a migration request message that is used to migrate the edge VNFC, to execute a migration process of the edge VNFC, where the migration request message carries the second location information.

In this way, when a location of a user is updated, the edge VNFC can be migrated in time to a location proximate to the user, improving quality of service of a business, reducing a service delay and improving user experience.

According to a second aspect, a method for deploying a virtualized network function using network edge computing is provided, where the virtualized network function is completed by using a central virtualized network function component VNFC and an edge VNFC, and the method includes:

receiving, by a VNFM, a creation request message that is sent by the central VNFC and that is used to create the edge VNFC, where the creation request message carries first location information of a user terminal; and sending, by the VNFM to a VIM, a first request message that is used to create a virtual machine or a container of the edge VNFC, where the first request message carries the first location information of the user terminal and a mirror of the edge VNFC, and a deployment process of the edge VNFC is executed by using the VIM, where the virtualized network function is completed by using the central VNFC and the edge VNFC, and the edge VNFC is configured based on the first location information.

With reference to the second aspect, in a possible design, after the VIM executes the deployment process of the edge VNFC, the method further includes:

receiving, by the VNFM, a migration request message that is sent by the central VNFC and that is used to migrate the edge VNFC, where the migration request message carries second location information of the user terminal; and sending, by the VNFM to the VIM, a second request message that is used to migrate the virtual machine or the container of the edge VNFC, where the second request message carries the second location information of the user terminal, and a migration process of the edge VNFC is executed by using the VIM.

According to a third aspect, a method for deploying a virtualized network function using network edge computing is provided, including:

receiving, by a VIM, a first request message that is sent by a VNFM and that is used to create a virtual machine or a container of an edge VNFC, where the first request message carries first location information of a user terminal and a mirror of the edge VNFC; and determining, by the VIM, an original edge server based on the first location information, and deploying the edge VNFC on the original edge server based on the mirror of the edge VNFC, to complete a deployment process of the edge VNFC, where the virtualized network function is completed by using a central VNFC and the edge VNFC.

With reference to the third aspect, in a possible design, after the deployment process of the edge VNFC is completed, the method further includes:

receiving, by the VIM, a second request message that is sent by the VNFM and that is used to migrate the virtual machine or the container of the edge VNFC, where the second request message carries second location information of the user terminal;

determining, by the VIM, a target edge server based on the second location information; and sending, by the VIM to the original edge server and the target edge server, indication information that is used to migrate the virtual machine or the container of the edge VNFC, to complete a migration process of the edge VNFC.

According to a fourth aspect, a method for deploying a virtualized network function using network edge computing is provided, where the virtualized network function is completed by using a central VNFC and an edge VNFC, and the method includes:

receiving, by a target edge server, indication information that is sent by a VIM and that is for migrating a virtual machine or a container of the edge VNFC from an original edge server to the target edge server; and receiving, by the target edge server, the virtual machine or the container of the edge VNFC that is sent by the original edge server, and providing a business service of the virtualized network function for the user terminal by using the virtual machine or the container of the edge VNFC.

According to a fifth aspect, a system for deploying a virtualized network function using network edge computing is provided, including a central VNFC, a VNFM, and a VIM, where the central VNFC is configured to: receive first location information sent by a user terminal, and send, to the virtualized network function manager VNFM, a creation request message that is used to create the edge VNFC, where the creation first request message carries the first location information;

the VNFM is configured to: receive the creation request message that is sent by the central VNFC and that is used to create the edge VNFC, and send, to the VIM, a first request message that is used to create a virtual machine or a container of the edge VNFC, where the first request message carries the first location information of the user terminal and a mirror of the edge VNFC; and the VIM is configured to: receive the first request message that is sent by the VNFM and that is used to create the virtual machine or the container of the edge VNFC, where the first request message carries the first location information of the user terminal and the mirror of the edge VNFC; and determine an edge server based on the first location information, and deploy the edge VNFC on the edge server based on the mirror of the edge VNFC, to complete a deployment process of the edge VNFC, where the virtualized network function is completed by using the central VNFC and the edge VNFC.

According to a sixth aspect, an apparatus for deploying a virtualized network function using network edge computing is provided, including:

a receiving unit, configured to receive first location information sent by a user terminal; and a sending unit, configured to send, to a virtualized network function manager VNFM, a creation request message that is used to create an edge VNFC, to execute a deployment process of the edge VNFC, where the creation request message carries the first location information, the virtualized network function is completed by using a central VNFC and the edge VNFC, and the edge VNFC is configured based on the first location information.

With reference to the sixth aspect, in a possible design, after the sending unit sends, to the VNFM, the creation request message that is used to create the edge VNFC, the receiving unit is further configured to:

receive a service registration request message sent by the deployed edge VNFC, where the edge VNFC is configured based on the first location information; and the sending unit is further configured to: send service configuration information and user terminal information to the edge VNFC, and provide a business service of the virtualized network function for the user terminal by using the edge VNFC.

With reference to the sixth aspect, in a possible design, after the sending unit sends the service configuration information and the user terminal information to the edge VNFC, the receiving unit is further configured to:

when location information of the user terminal changes, receive second location information sent by the user terminal; and the sending unit is further configured to send, to the VNFM, a migration request message that is used to migrate the edge VNFC, to execute a migration process of the edge VNFC, where the migration request message carries the second location information.

According to a seventh aspect, an apparatus for deploying a virtualized network function using network edge computing is provided, including:

a receiving unit, configured to receive a creation request message that is sent by a central VNFC and that is used to create an edge VNFC, where the creation request message carries first location information of a user terminal; and a sending unit, configured to send, to a VIM, a first request message that is used to create a virtual machine or a container of the edge VNFC, where the first request message carries the first location information of the user terminal and a mirror of the edge VNFC, and a deployment process of the edge VNFC is executed by using the VIM, where the virtualized network function is completed by using the central VNFC and the edge VNFC, and the edge VNFC is configured based on the first location information.

With reference to the seventh aspect, in a possible design, the receiving unit is further configured to:

after the deployment process of the edge VNFC is executed, receive a migration request message that is sent by the central VNFC and that is used to migrate the edge VNFC, where the migration request message carries second location information of the user terminal; and the sending unit is further configured to send, to the VIM, a second request message that is used to migrate the virtual machine or the container of the edge VNFC, where the second request message carries the second location information of the user terminal, and a migration process of the edge VNFC is executed by using the VIM.

According to an eighth aspect, an apparatus for deploying a virtualized network function using network edge computing is provided, and the apparatus includes:

a receiving unit, configured to receive a first request message that is sent by a VNFM and that is used to create a virtual machine or a container of an edge VNFC, where the first request message carries first location information of a user terminal and a mirror of the edge VNFC; and a processing unit, configured to: determine an original edge server based on the first location information, and deploy the edge VNFC on the original edge server based on the mirror of the edge VNFC, to complete a deployment process of the edge VNFC, where the virtualized network function is completed by using a central VNFC and the edge VNFC.

With reference to the eighth aspect, in a possible design, the apparatus further includes a sending unit, where after the processing unit completes the deployment process of the edge VNFC, the receiving unit is further configured to receive a second request message that is sent by the VNFM and that is used to migrate the virtual machine or the container of the edge VNFC, where the second request message carries second location information of the user terminal;

the processing unit is further configured to determine a target edge server based on the second location information; and the sending unit is configured to send, to the edge server and the target edge server, indication information that is used to migrate the virtual machine or the container of the edge VNFC, to complete a migration process of the edge VNFC.

According to a ninth aspect, an apparatus for deploying a virtualized network function using network edge computing is provided, and the apparatus includes:

a receiving unit, configured to receive indication information that is sent by a VIM and that is for migrating a virtual machine or a container of an edge VNFC from an original edge server to a target edge server, where the receiving unit is further configured to receive the virtual machine or the container of the edge VNFC that is sent by the original edge server; and a processing unit, configured to provide a business service of the virtualized network function for the user terminal by using the virtual machine or the container of the edge VNFC, where the virtualized network function is completed by using a central VNFC and the edge VNFC.

According to a tenth aspect, a device for deploying a virtualized network function is provided, and the device has a function of implementing an action of a central VNFC in the foregoing method implementation. The function may be implemented by hardware, or may be implemented by hardware by executing corresponding software. The hardware or the software includes one or more modules corresponding to the function.

In an optional implementation solution, a structure of the device includes a receiver, a transmitter, a processor, and a memory.

The processor is configured to support the device in executing a corresponding function of the central VNFC in the foregoing method, specifically including: receiving, by using the receiver, first location information sent by a user terminal; and sending, to a VNFM by using the transmitter, a creation request message that is used to create an edge VNFC, to execute a deployment process of the edge VNFC, where the creation request message carries the first location information.

The device may further include the memory. The memory is configured to be coupled to the processor, and the memory stores a program instruction and data that are necessary for the device.

According to an eleventh aspect, a device for deploying a network function is provided, and the device has a function of implementing an action of a VNFM in the foregoing method implementation. The function may be implemented by hardware, or may be implemented by hardware by executing corresponding software. The hardware or the software includes one or more modules corresponding to the function.

In an optional implementation solution, a structure of the device includes a receiver, a transmitter, a processor, and a memory.

The processor is configured to support the device in executing a corresponding function of the VNFM in the foregoing method, specifically including: receiving, by using the receiver, a creation request message that is sent by a central VNFC and that is used to create an edge VNFC, where the creation request message carries first location information of a user terminal; and sending, to a VIM by using the transmitter, a first request message that is used to create a virtual machine or a container of the edge VNFC, where the first request message carries the first location information of the user terminal and a mirror of the edge VNFC, and a deployment process of the edge VNFC is executed by using the VIM.

The device may further include the memory. The memory is configured to be coupled to the processor, and the memory stores a program instruction and data that are necessary for the device.

According to a twelfth aspect, a device for deploying a network function is provided, and the device has a function of implementing an action of a VIM in the foregoing method implementation. The function may be implemented by hardware, or may be implemented by hardware by executing corresponding software. The hardware or the software includes one or more modules corresponding to the function.

In an optional implementation solution, a structure of the device includes a receiver, a transmitter, a processor, and a memory.

The processor is configured to support the device in executing a corresponding function of the VIM in the foregoing method, specifically including: receiving, by using the receiver, a first request message that is sent by a VNFM and that is used to create a virtual machine or a container of an edge VNFC, where the first request message carries first location information of a user terminal and a mirror of the edge VNFC; and determining an edge server based on the first location information, and deploying the edge VNFC on the edge server based on the mirror of the edge VNFC, to complete a deployment process of the edge VNFC.

The device may further include the memory. The memory is configured to be coupled to the processor, and the memory stores a program instruction and data that are necessary for the device.

According to a thirteenth aspect, a device for deploying a network function is provided, and the device has a function of implementing an action of an edge server in the foregoing method implementation. The function may be implemented by hardware, or may be implemented by hardware by executing corresponding software. The hardware or the software includes one or more modules corresponding to the function.

In an optional implementation solution, a structure of the device includes a receiver, a transmitter, a processor, and a memory.

The processor is configured to support the device in executing a corresponding function of the edge server in the foregoing method, specifically including: receiving, by using the receiver, indication information that is sent by a VIM and that is for migrating a virtual machine or a container of an edge VNFC from an original edge server to a target edge server; receiving the virtual machine or the container of the edge VNFC that is sent by the original edge server; and providing a business service of the virtualized network function for the user terminal by using the virtual machine or the container of the edge VNFC.

The device may further include the memory. The memory is configured to be coupled to the processor, and the memory stores a program instruction and data that are necessary for the device.

Compared with the prior art, in the solutions for deploying a virtualized network function using network edge computing in the embodiments of the present invention, after receiving the first location information sent by the user terminal, the central VNFC sends, to the VNFM, the creation request message that is used to create the edge VNFC, where the creation first request message carries the first location information. After receiving the creation request message, the VNFM sends, to the VIM, the first request message that is used to create the virtual machine or the container of the edge VNFC, where the first request message carries the first location information and the mirror of the edge VNFC. The VIM determines the edge server based on the first location information, and deploys the edge VNFC on the edge server based on the mirror of the edge VNFC, to complete the deployment process of the edge VNFC. In this way, it can be implemented that a deployment location of the edge VNFC is proximate to a user in a NEC scenario, reducing a service delay, improving quality of service of a business, and reducing an internal bandwidth requirement of a network.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

Figure 1:
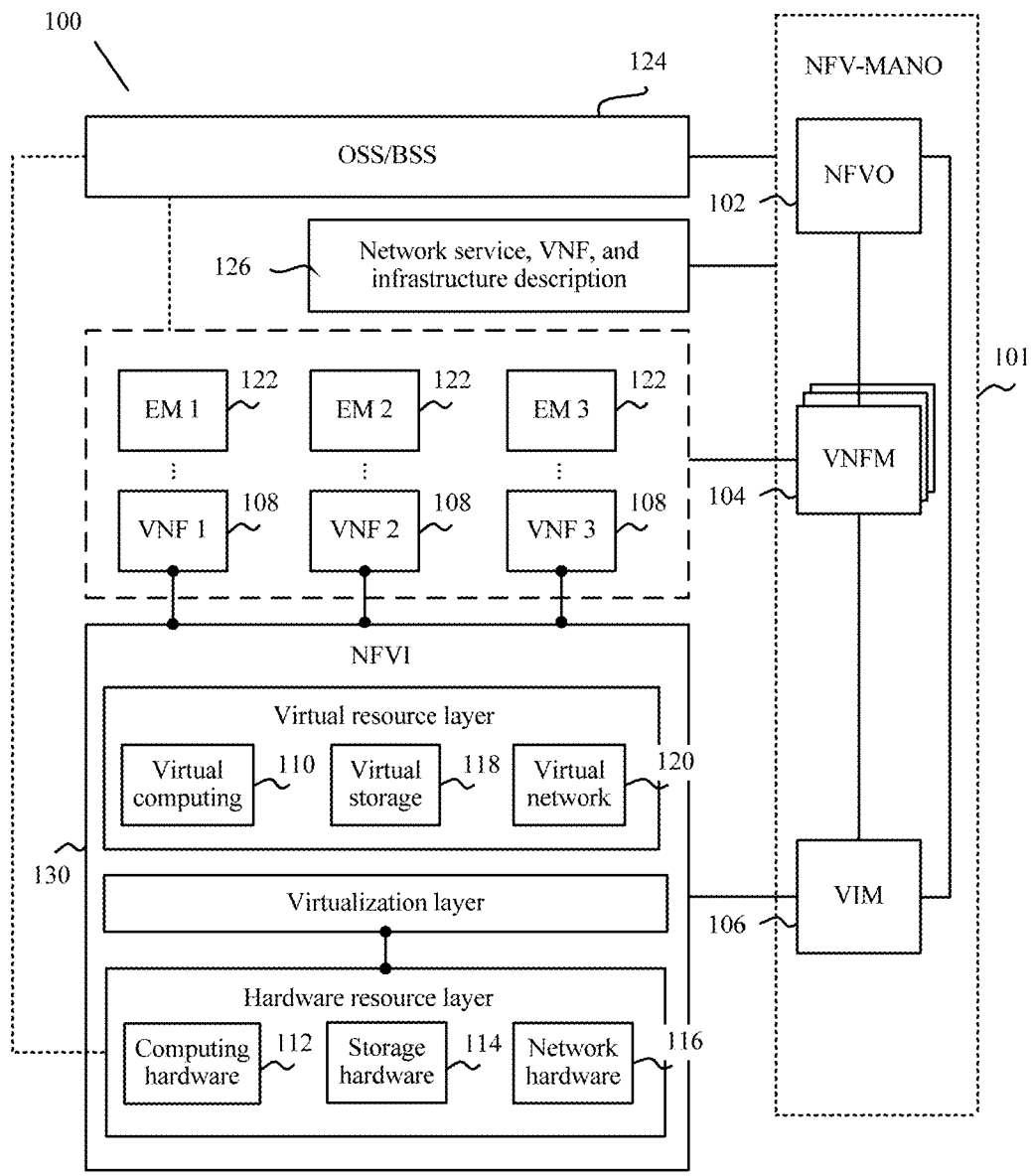
FIG. 1 is a diagram of an architecture of an NFV system.

FIG. 1 is a diagram of an architecture of an NFV system. The NFV system 100 may be used in various networks, for example, implemented in a data center network, an operator network, or a local area network. The NFV system 100 includes an NFV management and orchestration system (MANO) 101, an NFV infrastructure layer (NFVI) 130, a plurality of virtualized network functions (VNF) 108, a plurality of element management (EM) 122, a network service, VNF, and infrastructure description 126, and an operations support system/business support system (OSS/BSS) 124. The NFV management and orchestration system 101 includes an NFV orchestrator (NFVO) 102, one or more VNFMs (VNFM) 104, and a virtualized infrastructure manager (VIM) 106. The NFVI 130 includes computing hardware 112, storage hardware 114, network hardware 116, a virtualization layer, virtual computing 110, virtual storage 118, and a virtual network 120. The network service, VNF, and infrastructure description 126 and the OSS/BSS 124 are further discussed in the ETSI GS NFV 002 V1.1.1 standard.

The NFV management and orchestration system (NFV MANO) 101 is configured to perform monitoring and management on the VNF 108 and the NFVI 130. The NFVO 102 may implement network services (for example, L2 and L3 VPN services) on the NFVI 130, and may execute a resource-related request from the one or more VNFMs 104, send configuration information to the VNFM 104, and collect status information of the VNF 108. In addition, the NFVO 102 may communicate with the VIM 106, to implement resource allocation and/or reservation and exchange configuration and status information of a virtualized hardware resource. The VNFM 104 may manage one or more VNFs 108. The VNFM 104 may execute various management functions, such as instantiating, updating, querying, scaling, and/or terminating the VNF 108. The VIM 106 may execute a resource management function, for example, managing allocation of infrastructure resources (for example, adding resources to a virtual container), and an operating function (for example, collecting NFVI fault information). The VNFM 104 and the VIM 106 may communicate with each other to perform resource allocation and exchange configuration and status information of a virtualized hardware resource.

The NFVI 130 includes a hardware resource, a software resource, or a combination of a hardware resource and a software resource, to complete deployment of a virtualized environment. In other words, the hardware resource and the virtualization layer are configured to provide a virtual resource for the VNF 108, for example, the virtual resource is used as a virtual machine or a virtual container in another form. The hardware resource includes the computing hardware 112, the storage hardware 114, and the network hardware 116. The computing hardware 112 may be existing hardware on the market and/or user-customized hardware, and is configured to provide processing and computing resources. The storage hardware 114 may be a storage capacity provided in a network or a storage capacity (which is located in a local memory of a server) residing on the storage hardware 114. In an implementation solution, resources of the computing hardware 112 and the storage hardware 114 may be integrated. The network hardware 116 may be a switch, a router, and/or any other network device that is configured to have a switching function. The network hardware 116 may span a plurality of domains, and may include a plurality of networks interconnected by one or more transmission networks.

The virtualization layer in the NFVI 130 may abstract a hardware resource from a physical layer, and decouple the VNF 108, to provide a virtual resource for the VNF 108. A virtual resource layer includes the virtual computing 110, the virtual memory 118, and the virtual network 120. The virtual computing 110 and the virtual storage 118 may be provided for the VNF 108 in a form of a virtual machine and/or another virtual container. For example, one or more VNFs 108 may be deployed on a virtual machine (Virtual Machine). The virtualization layer abstracts the network hardware 116 to form the virtual network 120. The virtual network 120 may include a virtual switch (Virtual Switch), and the virtual switch is configured to provide a connection between one virtual machine and another virtual machine. In addition, the transmission network in the network hardware 116 may be virtualized by using a centralized control plane and a separate forwarding plane (for example, software-defined networking, SDN).

As shown in FIG. 1, the VNFM 104 may interact with the VNF 108 and the EM 122, to manage a life cycle of the VNF and exchange configuration and status information. The VNF 108 may be configured as virtualization of at least one network function executed by using a physical network device. For example, in an implementation solution, the VNF 108 may be configured to provide functions of different network elements in an IMS network, such as a network function of a P-SCSCF, an S-CSCF, or an HSS. The EM 122 is configured to manage one or more VNFs 108.

Figure 2:
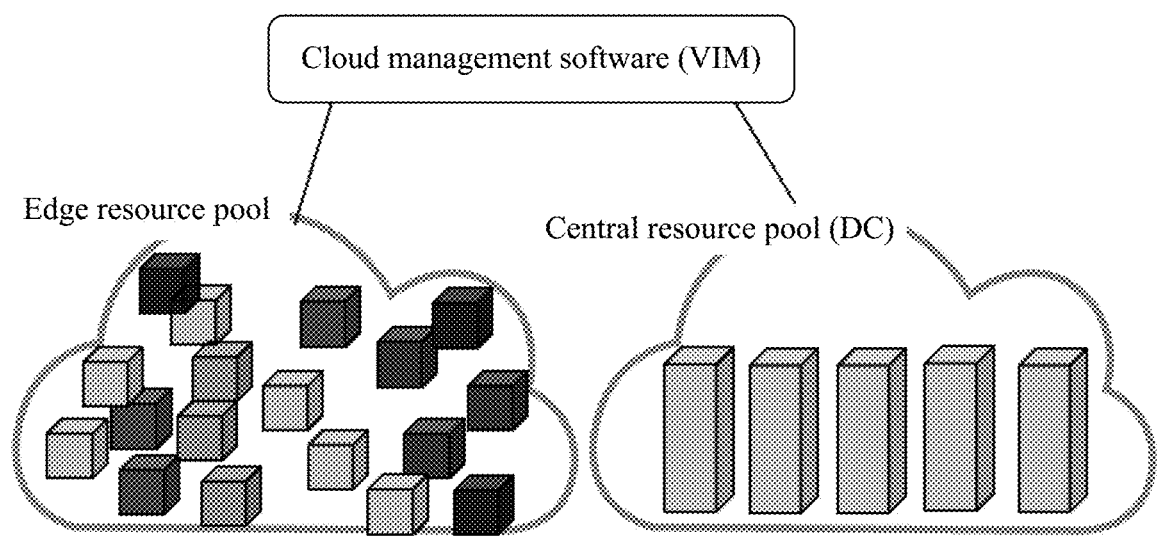
FIG. 2 is a schematic diagram of resource pool management according to an embodiment of the present invention.

Based on the diagram of the architecture of the NFV system shown in FIG. 1, in the embodiments of the present invention, as required by NEC, the NFVI is divided into at least two resource pools: One is a central resource pool, including several central servers deployed in a centralized data center; and the other is an edge resource pool, including several edge servers having a computing function that are deployed on an edge of a network element, such as a base station controller, a home gateway, and a set-top box. To ensure consistency of deployed interfaces and capabilities, the central resource pool and the edge resource pool are managed by one VIM. For details, refer to FIG. 2.

Figure 3:
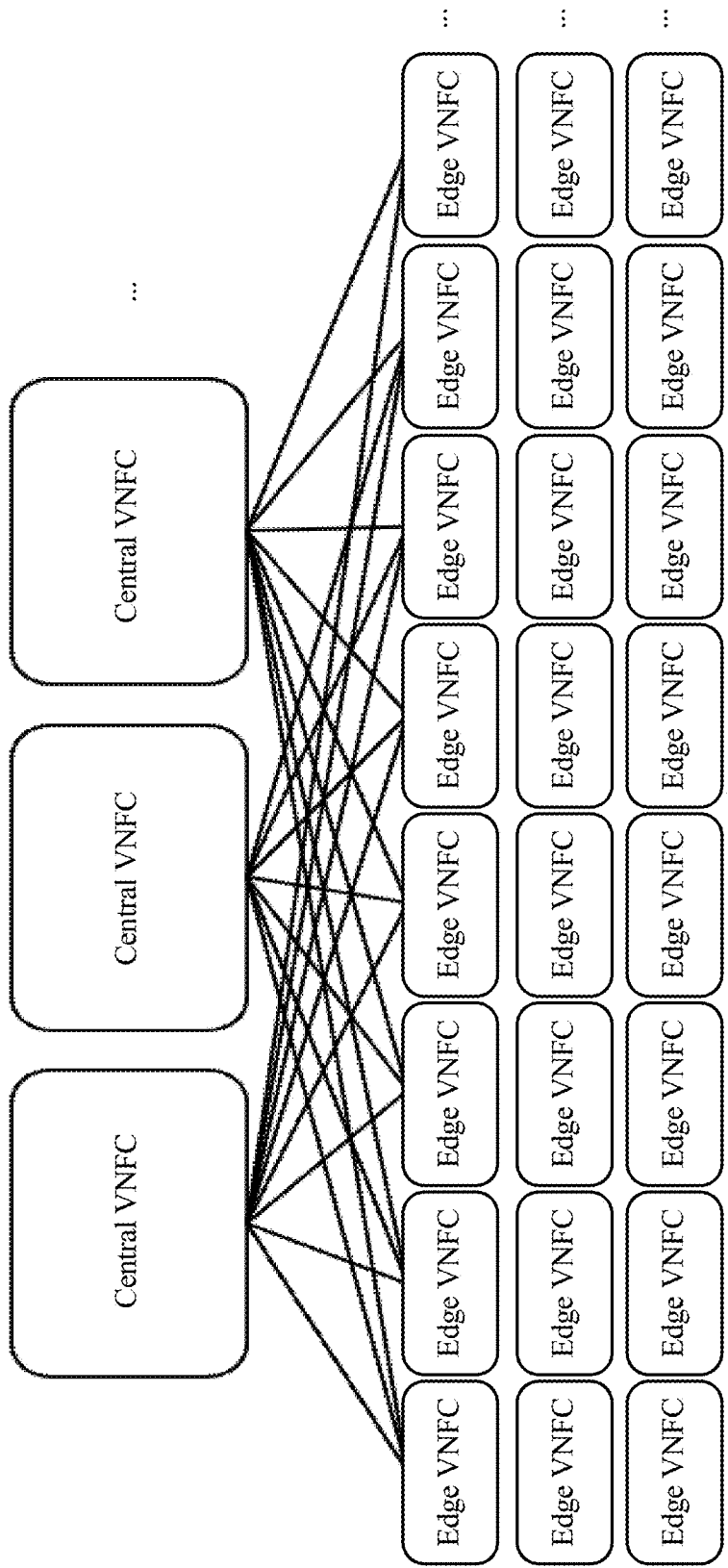
FIG. 3 is a schematic diagram of deployment of a central VNFC and an edge VNFC inside a VNF according to an embodiment of the present invention.

Specifically, as shown in FIG. 3, there are also two types of VNFCs inside the VNF: One is a central VNFC deployed in the central resource pool, and the other is an edge VNFC deployed in the edge resource pool. The central VNFC is deployed in the central resource pool, and the edge VNFC is deployed in the edge resource pool. Each VNF includes at least one central VNFC. Main functions of the central VNFC include functions such as access and service selection of all users, and providing a basic service function for the user when the edge VNFC cannot be deployed (no edge resource pool device is proximate to the user, or resources of the edge resource pool device proximate to the user have been used up). A quantity of edge VNFCs is not fixed. The VNF may have no edge VNFC, for example, there is no user when the VNF is just deployed. A VNF with a large quantity of users may have thousands of edge VNFCs, and the edge VNFC is configured to provide a service function with best experience for one or more users.

A resource requirement of the edge VNFC is also described by using a virtualization deployment unit (VDU) in a virtualized network function descriptor (VNFD). However, compared with that of the central VNFC, the quantity of the edge VNFCs is variable in an extremely large range. Therefore, a current method for describing VNFCs one by one in the VNFD is not applicable to the edge VNFC. For example, Table 1 is a description of a VNFC in a management and orchestration (Management and Orchestration, MANO) standard.

TABLE 1

| Identifier (Identifier) | Type (Type) | Value (Cardinality) | Description (Description) |
|---|---|---|---|
| Identity (id) | Leaf node (Leaf) | 1 | Is a unique VNFC identity in a specific VNF name space. |
| Connection point (connection_point) | Element node (Element) | 1, . . . , and N | Describes a network connection relationship between a VNFC and an internal virtual connection. |

Therefore, an embodiment of the present invention provides an improved description method used to describe the edge VNFC, as shown in Table 2. A field in Table 2 is referred to as "VNFC_set" (VNFC_set). Like the VNFC, the VNFC_set field is a member field of the VNFD. A main improvement is that an "id range" field is used to replace an "id" field, and edge VNFCs within a specified ID range may be described once, for example, id range={1, 1000} is used to describe 1000 edge VNFCs whose IDs are 1 to 1000.

TABLE 2

| Identifier (Identifier) | Type (Type) | Value (Cardinality) | Description (Description) |
|---|---|---|---|
| Identity range (Id range) | Leaf node (Leaf) | 1 | Is a unique VNFC identity range in a specific VNF name space. |
| Connection point (connection_point) | Element node (Element) | 1, . . . , and N | Describes a network connection relationship between a VNFC and an internal virtual connection. |

Figure 4:
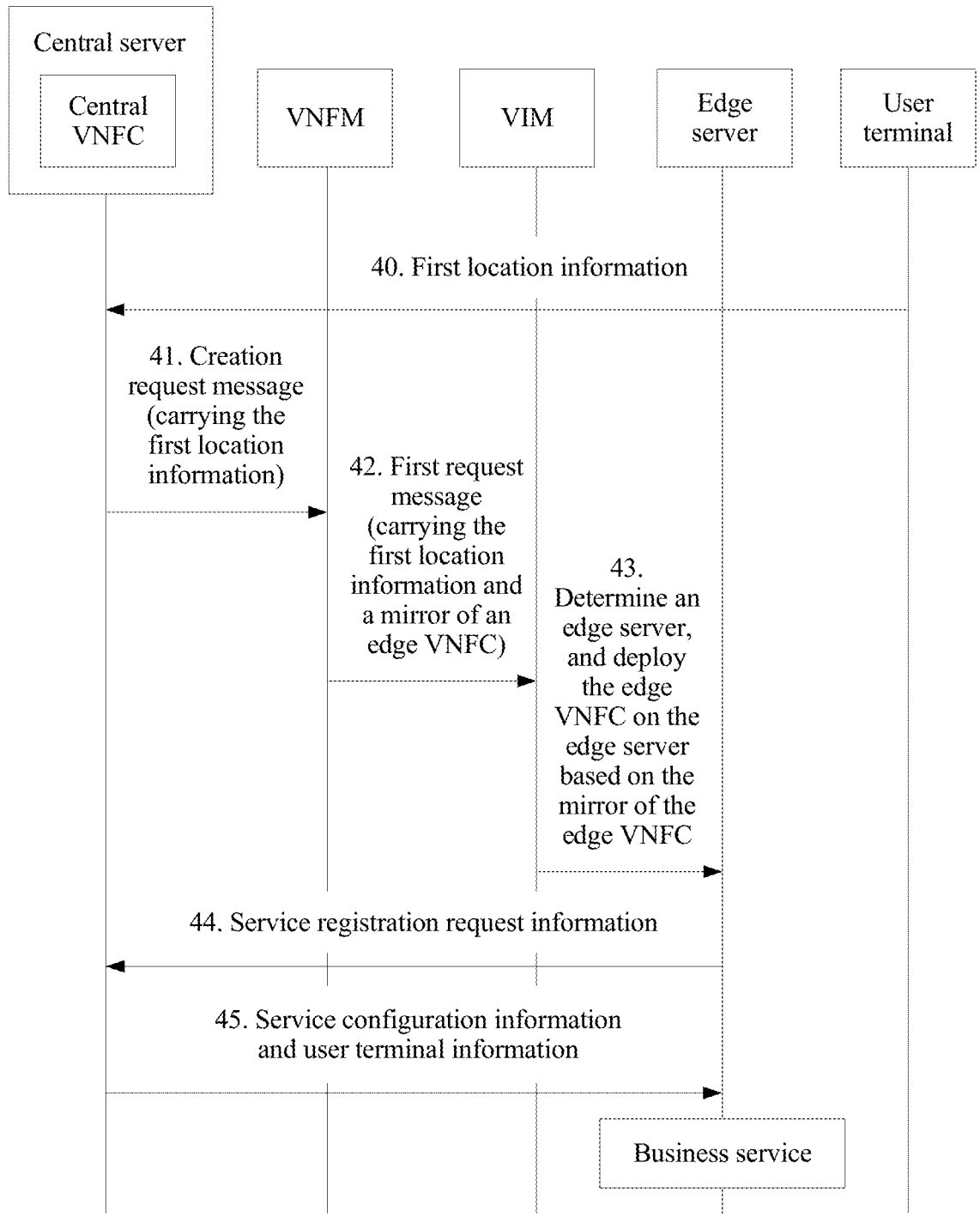
FIG. 4 is a flowchart of a method for deploying a virtualized network function using network edge computing according to an embodiment of the present invention.

As shown in FIG. 4, an embodiment of the present invention provides a method for deploying a virtualized network function using network edge computing. The virtualized network function is completed by using a central VNFC and an edge VNFC. The central VNFC is deployed on a central server of a central resource pool, and the edge VNFC is deployed on an edge server of an edge resource pool. A specific procedure includes the following steps.

Step 40: The central VNFC receives first location information sent by a user terminal.

Location information (such as a cell number of a location area or a terminal device ID) of the user terminal does not exist and cannot be carried in a transport layer protocol such as the Internet Protocol (Internet Protocol, IP), the Transmission Control Protocol (Transmission Control Protocol, TCP), and the User Datagram Protocol (User Datagram Protocol, UDP), and is carried only in a service layer protocol such as the Hypertext Transfer Protocol (HTTP) and the SIP protocol. In addition, only a VNF can parse a service layer protocol message. Therefore, the user terminal adds the first location information of the user terminal to a service layer protocol message of the user terminal, and sends the service layer protocol message to the central VNFC. In a process of registering or applying for a service by a user, the central VNFC obtains, through parsing, the first location information of the user terminal from the service layer protocol message.

Step 41: The central VNFC sends, to a VNFM, a creation request message that is used to create the edge VNFC, where the creation request message carries the first location information.

Step 42: The VNFM sends, to a VIM, a first request message that is used to create a virtual machine or a container of the edge VNFC, where the first request message carries the first location information of the user terminal and a mirror of the edge VNFC.

The mirror of the edge VNFC is packaged software based on which the edge VNFC is deployed, including an operating system, a program file, a data file, and the like of the virtual machine.

Step 43: The VIM determines the edge server based on the first location information, and deploys the edge VNFC on the edge server based on the mirror of the edge VNFC.

A parameter needs to be added to a VM or container creation interface of the VIM to indicate location information of the edge VNFC. For example, OpenStack is currently widely used cloud management software, and an EdgeLocationInfo parameter is added to a create server (create server) interface of the OpenStack to carry the location information of the user terminal, so that the foregoing function can be implemented. For details, refer to Table 3.

TABLE 3

| Parameter (Parameter) | Style (Style) | Type (Type) | Description (Description) |
|---|---|---|---|
| tenant_id | URI | csapi:UUID | |
| security_groups (Optional) | plain | xsd:string | |
| user_data (Optional) | plain | xsd:string | |
| availability_zone (Optional) | plain | xsd:string | |
| server | plain | csapi:ServerForCreate | |
| imageRef | plain | csapi:string | |
| flavorRef | plain | csapi:string | |
| networks (Optional) | plain | xsd:string | |
| uuid (Optional) | plain | xsd:string | |
| port (Optional) | plain | xsd:string | |
| fixed_ip (Optional) | plain | xsd:string | |
| name | plain | csapi:string | |
| metadata (Optional) | plain | csapi:string | |
| personality (Optional) | plain | csapi:string | |
| block_device_mapping_v2 (Optional) | plain | csapi:string | |
| device_name | plain | csapi:string | |
| source_type | plain | csapi:string | |

TABLE 3-continued

| Parameter (Parameter) | Style (Style) | Type (Type) | Description (Description) |
|---|---|---|---|
| destination_type (Optional) | plain | csapi:string | |
| delete_on_termination | plain | csapi:string | |
| guest_format | plain | csapi:string | |
| boot_index | plain | csapi:string | |
| config_drive | plain | xsd:boolean | |
| key_name (Optional) | plain | xsd:string | |
| os:scheduler_hints (Optional) | plain | xsd:dict | |
| OS-DCF:diskConfig (Optional) | plain | xsd:string | |
| EdgeLocationInfo (Optional) | plain | Xsd:string | Describes location information of an edge VNFC that needs to be deployed in a NEC scenario. |

Specifically, the VIM having an edge resource pool management capability obtains a relationship between the first location information of the user terminal and a specific edge server through manual configuration or self-discovery. If an available resource of an edge server associated with the first location information in the first request that is of the VNFM and that is for deploying the edge VNFC satisfies a resource requirement of the to-be-deployed edge VNFC, the edge VNFC is deployed on the edge server. Otherwise, the edge VNFC deployment request of the VNFM is rejected.

Step 44: After deployment of the edge VNFC is completed, the edge VNFC sends service registration request information to the central VNFC.

Step 45: The central VNFC delivers service configuration information and user terminal information to the edge VNFC, so that the edge VNFC provides a business service of the virtualized network function for a user.

In a mobile network, movement of the user terminal is accompanied with a change of the location information, and a deployment location of the edge VNFC also needs to be adjusted based on the change of the location information of the user terminal. When the location information of the user terminal changes, new location information is notified to the central VNFC, and the central VNFC instructs the VNFM to migrate the edge VNFC. The VNFM instructs the VIM to migrate the VM or the container of the edge VNFC. The VIM learns a target edge server by using an association relationship between the known location information and an edge server, and if an available resource of the target edge server is enough to deploy the VM or the container of the to-be-migrated edge VNFC, sends, to the original edge server and the target edge server, an indication for migrating the VM or the container. For a specific process, refer to FIG. 5.

Figure 5:
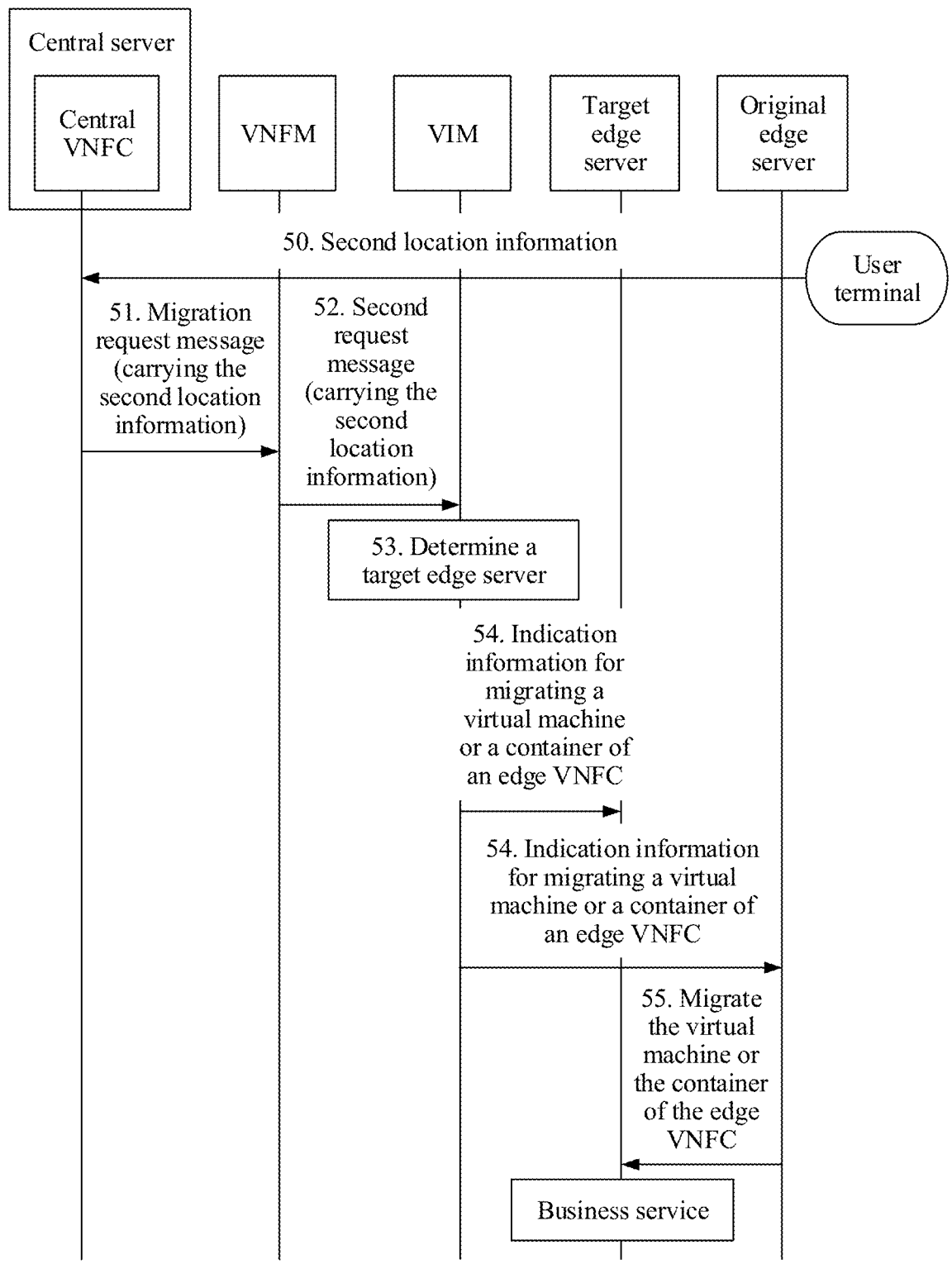
FIG. 5 is a flowchart of a method for migrating a VM or a container of an edge VNFC according to an embodiment of the present invention.

FIG. 5 shows a procedure of a method for migrating a VM or a container of an edge VNFC, and specific steps are as follows.

Step 50: When location information of a user terminal changes, a central VNFC receives second location information sent by the user terminal.

Optionally, the user terminal adds the second location information of the user terminal to a service layer protocol message of the user terminal, and sends the service layer protocol message to the central VNFC. In a process of applying for a service, the central VNFC obtains, through parsing, the second location information of the user terminal from the service layer protocol message.

Step 51: The central VNFC sends, to a VNFM, a migration request message that is used to migrate the edge VNFC, where the migration request message carries the second location information.

Step 52: The VNFM sends, to a VIM, a second request message that is used to migrate the virtual machine or the container of the edge VNFC, where the second request message carries the second location information of the user terminal.

Step 53: The VIM determines a target edge server based on the second location information.

A parameter needs to be added to a VM or container migration interface of the VIM to indicate new location information of the edge VNFC. For example, an EdgeLocationInfo parameter is added to a migrate server (migrate server) interface of OpenStack to carry the new location information of the user terminal, so that the foregoing function can be implemented. For details, refer to Table 4.

TABLE 4

| Parameter (Parameter) | Style (Style) | Type (Type) | Description (Description) |
|---|---|---|---|
| tenant_id | URI | csapi:UUID | |
| server id | plain | csapi:ServerForCreate | |
| migrate | plain | xsd:string | |
| EdgeLocationInfo (Optional) | plain | Xsd:string | Describes new location information of an edge VNFC that needs to be migrated in a NEC scenario. |

Step 54: The VIM sends, to an original edge server and the target edge server, indication information that is used to migrate the virtual machine or the container of the edge VNFC, to complete a migration process of the edge VNFC.

Step 55: The original edge server migrates the virtual machine or the container of the edge VNFC to the target edge server.

Optionally, the virtual machine or the container of the edge VNFC may be migrated by using a live migration technology or a cold migration technology. The VM or the container of the edge VNFC is migrated from the original edge server to the target edge server, and continue to provide a business service for the user. During live migration, the original edge server continues to serve the user, the original edge server is not disabled in a migration process, and the VM and the container of the edge VNFC are copied into the target edge server. During cold migration, the original edge server needs to be disabled first, and then user data stored in the VM and the container of the edge VNFC is copied into the target edge server.

Figure 6:
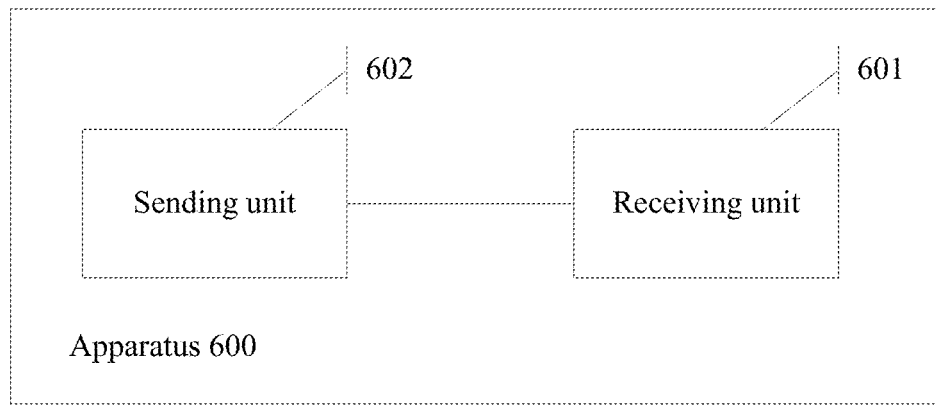
FIG. 6 is a schematic structural diagram of an apparatus for deploying a virtualized network function using network edge computing according to an embodiment of the present invention.

Based on the method for deploying a virtualized network function provided in the foregoing embodiment, an embodiment of the present invention provides an apparatus 600 for deploying a network function. The apparatus may be configured to execute an execution process of a central VNFC in the methods described in FIG. 4 and FIG. 5. FIG. 6 is a schematic structural diagram of the apparatus 600 according to this embodiment of the present invention. As shown in FIG. 6, the apparatus 600 includes a receiving unit 601 and a sending unit 602.

The receiving unit 601 is configured to receive first location information sent by a user terminal.

The sending unit 602 is configured to send, to a virtualized network function manager VNFM, a creation request message that is used to create an edge VNFC, to execute a deployment process of the edge VNFC, where the creation request message carries the first location information, the virtualized network function is completed by using a central VNFC and the edge VNFC, and the edge VNFC is configured based on the first location information.

Optionally, after the sending unit 602 sends, to the VNFM, the creation request message that is used to create the edge VNFC, the receiving unit 601 is further configured to:

receive a service registration request message sent by the deployed edge VNFC, where the edge VNFC is configured based on the first location information; and the sending unit 602 is further configured to: send service configuration information and user terminal information to the edge VNFC, and provide a business service of the virtualized network function for the user terminal by using the edge VNFC.

Optionally, after the sending unit sends the service configuration information and the user terminal information to the edge VNFC, the receiving unit is further configured to:

when location information of the user terminal changes, receive second location information sent by the user terminal; and the sending unit is further configured to send, to the VNFM, a migration request message that is used to migrate the edge VNFC, to execute a migration process of the edge VNFC, where the migration request message carries the second location information.

The apparatus 600 related in this embodiment of the present invention may be an independent component, or may be integrated into another component.

It should be noted that, for function implementation and an interaction manner of each unit of the apparatus 600 in this embodiment of the present invention, further refer to descriptions in a related method embodiment. Details are not described herein.

Figure 7:
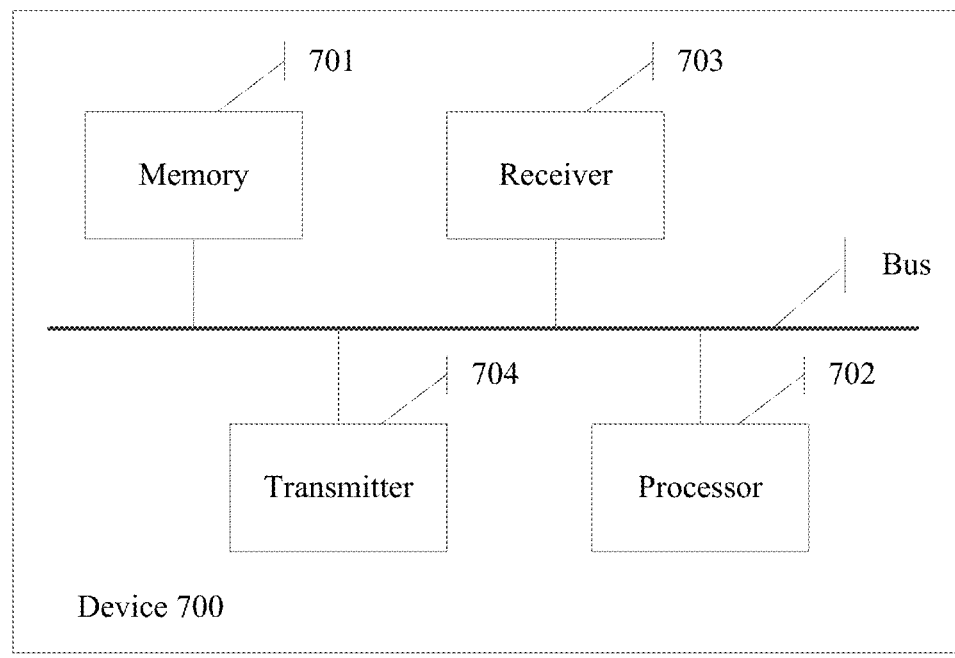
FIG. 7 is a schematic structural diagram of a device for deploying a virtualized network function using network edge computing according to an embodiment of the present invention.

Referring to FIG. 7, based on a same invention concept, an embodiment of the present invention further provides a device 700 for deploying a network function. The device 700 may be configured to execute an execution process of a central VNFC in the methods described in FIG. 4 and FIG. 5. As shown in FIG. 7, the device 700 includes a memory 701, a processor 702, a receiver 703, and a transmitter 704. Program code that executes the solution of the present invention is stored in the memory 701, and the processor 702 controls the execution.

A program stored in the memory 701 is used to instruct the processor 702 to execute a method for deploying a network function, including: receiving, by using the receiver 703, first location information sent by a user terminal; and sending, to a VNFM by using the transmitter 704, a creation request message that is used to create an edge VNFC, to execute a deployment process of the edge VNFC, where the creation request message carries the first location information, the virtualized network function is completed by using a central VNFC and the edge VNFC, and the edge VNFC is configured based on the first location information.

The processor 702 may be a central processing unit (CPU) or an application-specific integrated circuit (ASIC), may be one or more integrated circuits configured to control program execution, may be a hardware circuit developed by using a field programmable gate array (FPGA), or may be a baseband chip.

There may be one or more memories 701. The memory 701 may be a read-only memory (ROM), a random access memory (RAM), or a magnetic disk storage.

The receiver 703 may be configured to communicate with an external device. For example, the receiver 703 may communicate with the user terminal.

The transmitter 704 may be configured to communicate with an external device. For example, the transmitter 704 may also communicate with the user terminal.

The transmitter 704 and the receiver 703 may be a same entity module, for example, may be an entity module that can implement transmitting and receiving functions. For example, the entity module may be referred to as a transceiver. Alternatively, the transmitter 704 and the receiver 703 may be separate entity modules.

The memory 701, the transmitter 704, and the receiver 703 may be connected to the processor 702 by using a bus, or may be separately connected to the processor 702 by using a dedicated connection cable.

Code corresponding to a method shown above is built into a chip by designing and programming the processor 702, so that when running, the chip can perform the methods shown in FIG. 4 and FIG. 5. How to design and program the processor 702 is a technology well known to persons skilled in the art. Details are not described herein.

It may be understood that the device 700 in this embodiment may be configured to implement all functions of the central VNFC on a central server related in the foregoing method embodiment. For a specific implementation process, refer to related descriptions of the foregoing method embodiment. Details are not described herein.

Figure 8:
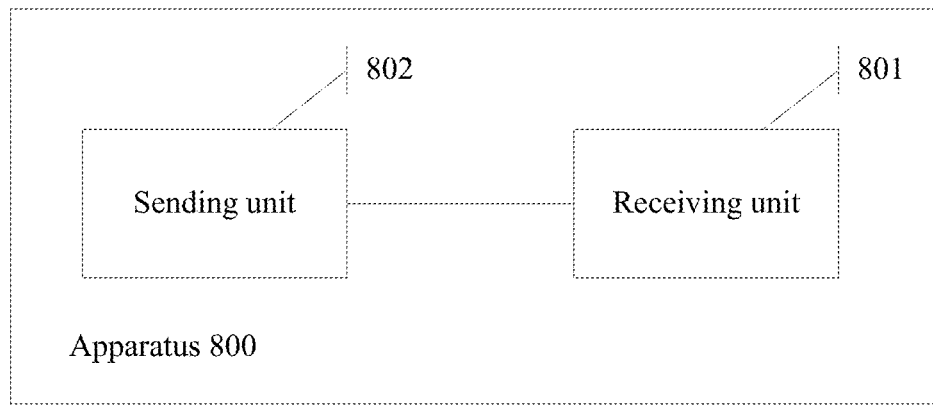
FIG. 8 is a schematic structural diagram of another apparatus for deploying a virtualized network function using network edge computing according to an embodiment of the present invention.

Based on the method for deploying a virtualized network function provided in the foregoing embodiment, an embodiment of the present invention provides an apparatus 800 for deploying a network function. The apparatus may be configured to execute an execution process of a VNFM in the methods described in FIG. 4 and FIG. 5. FIG. 8 is a schematic structural diagram of the apparatus 800 according to this embodiment of the present invention. As shown in FIG. 8, the apparatus 800 includes a receiving unit 801 and a sending unit 802.

The receiving unit 801 is configured to receive a creation request message that is sent by a central VNFC and that is used to create an edge VNFC, where the creation request message carries first location information of a user terminal.

The sending unit 802 is configured to send, to a virtualized infrastructure manager VIM, a first request message that is used to create a virtual machine or a container of the edge VNFC, where the first request message carries the first location information of the user terminal and a mirror of the edge VNFC, and a deployment process of the edge VNFC is executed by using the VIM.

The virtualized network function is completed by using the central VNFC and the edge VNFC, and the edge VNFC is configured based on the first location information.

Optionally, the receiving unit 801 is further configured to:

after the deployment process of the edge VNFC is executed, receive a migration request message that is sent by the central VNFC and that is used to migrate the edge VNFC, where the migration request message carries second location information of the user terminal; and the sending unit 802 is further configured to send, to the VIM, a second request message that is used to migrate the virtual machine or the container of the edge VNFC, where the second request message carries the second location information of the user terminal, and a migration process of the edge VNFC is executed by using the VIM.

The apparatus 800 related in this embodiment of the present invention may be an independent component, or may be integrated into another component.

It should be noted that, for function implementation and an interaction manner of each unit of the apparatus 800 in this embodiment of the present invention, further refer to descriptions in a related method embodiment. Details are not described herein.

Figure 9:
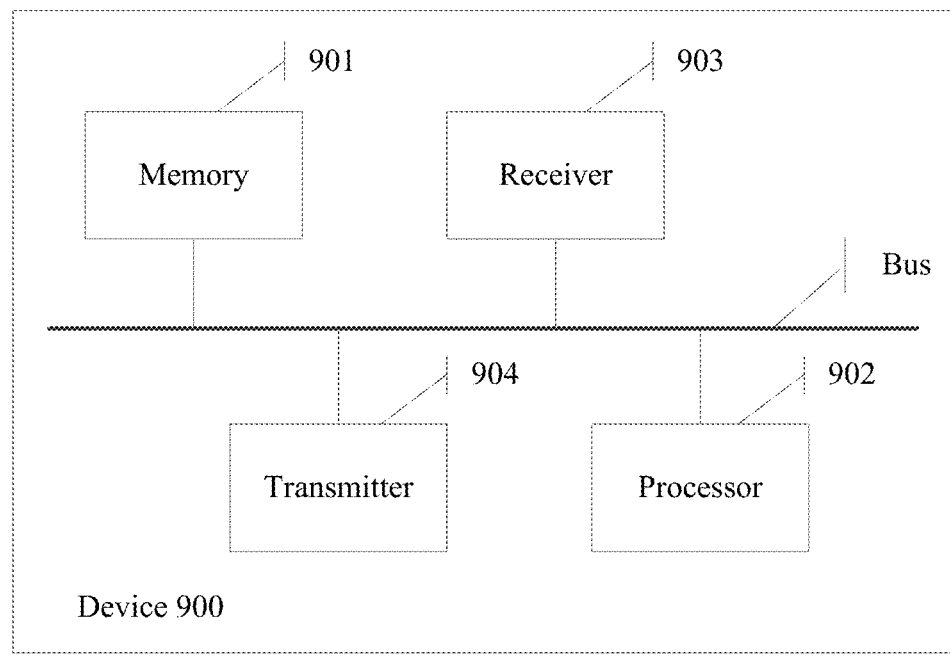
FIG. 9 is a schematic structural diagram of another device for deploying a virtualized network function using network edge computing according to an embodiment of the present invention.

Referring to FIG. 9, based on a same invention concept, an embodiment of the present invention further provides a device 900 for deploying a network function. The device 900 may be configured to execute an execution process of a VNFM in the methods described in FIG. 4 and FIG. 5. As shown in FIG. 9, the device 900 includes a memory 901, a processor 902, a receiver 903, and a transmitter 904. Program code that executes the solution of the present invention is stored in the memory 901, and the processor 902 controls the execution.

A program stored in the memory 901 is used to instruct the processor 902 to execute a method for deploying a network function, including: receiving, by using the receiver 903, a creation request message that is sent by a central VNFC and that is used to create an edge VNFC, where the creation request message carries first location information of a user terminal; and sending, to a VIM by using the transmitter 904, a first request message that is used to create a virtual machine or a container of the edge VNFC, where the first request message carries the first location information of the user terminal and a mirror of the edge VNFC, a deployment process of the edge VNFC is executed by using the VIM, the virtualized network function is completed by using the central VNFC and the edge VNFC, and the edge VNFC is configured based on the first location information.

The processor 902 may be a CPU or a specific ASIC, may be one or more integrated circuits configured to control program execution, may be a hardware circuit developed by using an FPGA, or may be a baseband chip.

There may be one or more memories 901. The memory 901 may be a ROM, a RAM, or a magnetic disk storage.

The receiver 903 may be configured to communicate with an external device. For example, the receiver 903 may communicate with the central VNFC.

The transmitter 904 may be configured to communicate with an external device. For example, the transmitter 904 may communicate with the VIM.

The transmitter 904 and the receiver 903 may be a same entity module, for example, may be an entity module that can implement transmitting and receiving functions. For example, the entity module may be referred to as a transceiver. Alternatively, the transmitter 904 and the receiver 903 may be separate entity modules.

The memory 901, the transmitter 904, and the receiver 903 may be connected to the processor 902 by using a bus, or may be separately connected to the processor 902 by using a dedicated connection cable.

Code corresponding to a method shown above is built into a chip by designing and programming the processor 902, so that when running, the chip can perform the methods shown in FIG. 4 and FIG. 5. How to design and program the processor 902 is a technology well known to persons skilled in the art. Details are not described herein.

It may be understood that the device 900 in this embodiment may be configured to implement all functions of the VNFM related in the foregoing method embodiment. For a specific implementation process, refer to related descriptions of the foregoing method embodiment. Details are not described herein.

Figure 10A:
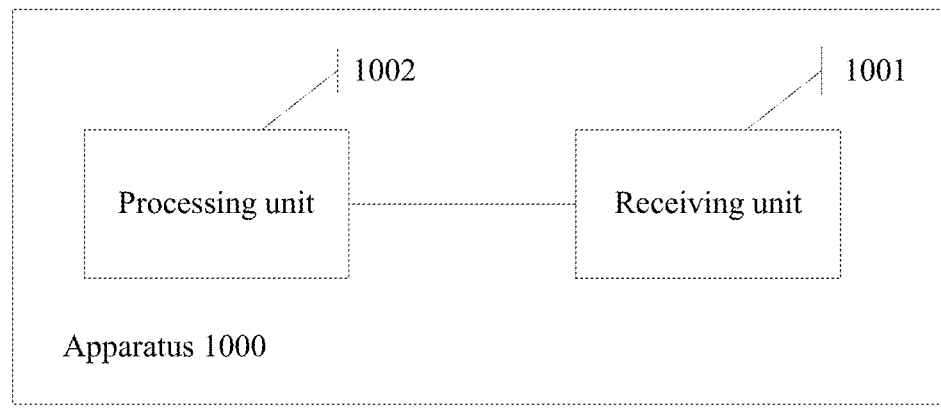
FIG. 10A and FIG. 10B are schematic structural diagrams of still another apparatus for deploying a virtualized network function using network edge computing according to an embodiment of the present invention.

Based on the method for deploying a virtualized network function provided in the foregoing embodiment, an embodiment of the present invention provides an apparatus 1000 for deploying a network function. The apparatus may be configured to execute an execution process of a VIM in the methods described in FIG. 4 and FIG. 5. FIG. 10A is a schematic structural diagram of the apparatus 1000 according to this embodiment of the present invention. As shown in FIG. 10A, the apparatus 1000 includes a receiving unit 1001 and a processing unit 1002.

The receiving unit 1001 is configured to receive a first request message that is sent by a virtualized network function manager VNFM and that is used to create a virtual machine or a container of an edge VNFC, where the first request message carries first location information of a user terminal and a mirror of the edge VNFC.

The processing unit 1002 is configured to: determine an edge server based on the first location information, and deploy the edge VNFC on the edge server based on the mirror of the edge VNFC, to complete a deployment process of the edge VNFC, where the virtualized network function is completed by using a central VNFC and the edge VNFC.

Figure 10B:
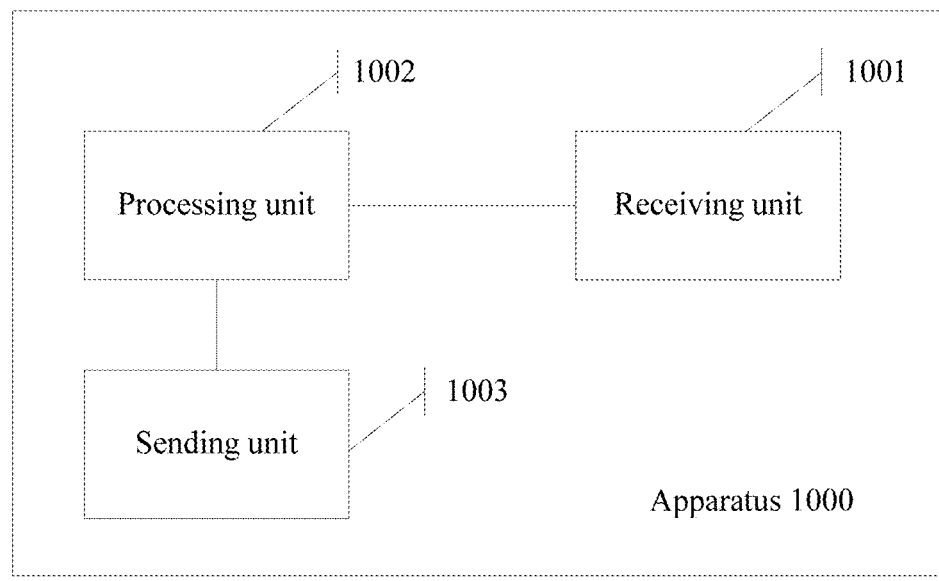

Optionally, as shown in FIG. 10B, the apparatus further includes a sending unit 1003.

After the processing unit 1002 completes the deployment process of the edge VNFC, the receiving unit 1001 is further configured to receive a second request message that is sent by the VNFM and that is used to migrate the virtual machine or the container of the edge VNFC, where the second request message carries second location information of the user terminal.

The processing unit 1002 is further configured to determine a target edge server based on the second location information.

The sending unit 1003 is configured to send, to the edge server and the target edge server, indication information that is used to migrate the virtual machine or the container of the edge VNFC, to complete a migration process of the edge VNFC.

The apparatus 1000 related in this embodiment of the present invention may be an independent component, or may be integrated into another component.

It should be noted that, for function implementation and an interaction manner of each unit of the apparatus 1000 in this embodiment of the present invention, further refer to descriptions in a related method embodiment. Details are not described herein.

Figure 11A:
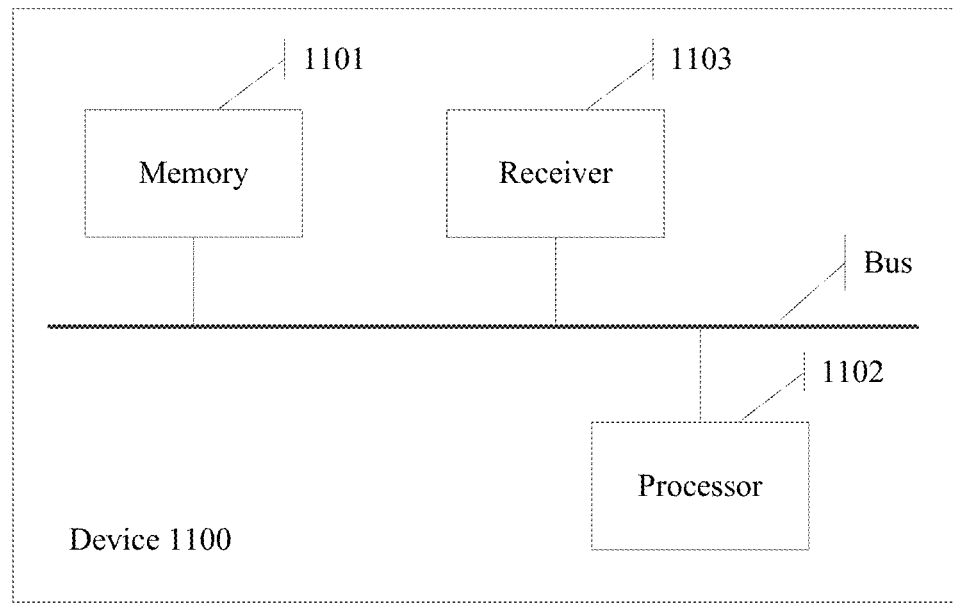
FIG. 11A and FIG. 11B are schematic structural diagrams of still another device for deploying a virtualized network function using network edge computing according to an embodiment of the present invention.

Referring to FIG. 11A, based on a same invention concept, an embodiment of the present invention further provides a device 1100 for deploying a network function. The device 1100 may be configured to execute an execution process of a VNFM in the methods described in FIG. 4 and FIG. 5. As shown in FIG. 11A, the device 1100 includes a memory 1101, a processor 1102, and a receiver 1103. Program code that executes the solution of the present invention is stored in the memory 1101, and the processor 1102 controls the execution.

A program stored in the memory 1101 is used to instruct the processor 1102 to execute a method for deploying a network function, including: receiving, by using the receiver 1103, a first request message that is sent by a VNFM and that is used to create a virtual machine or a container of an edge VNFC, where the first request message carries first location information of a user terminal and a mirror of the edge VNFC; and determining an edge server based on the first location information, and deploying the edge VNFC on the edge server based on the mirror of the edge VNFC, to complete a deployment process of the edge VNFC, where the virtualized network function is completed by using a central VNFC and the edge VNFC.

The processor 1102 may be a CPU or a specific ASIC, may be one or more integrated circuits configured to control program execution, may be a hardware circuit developed by using an FPGA, or may be a baseband chip.

Figure 11B:
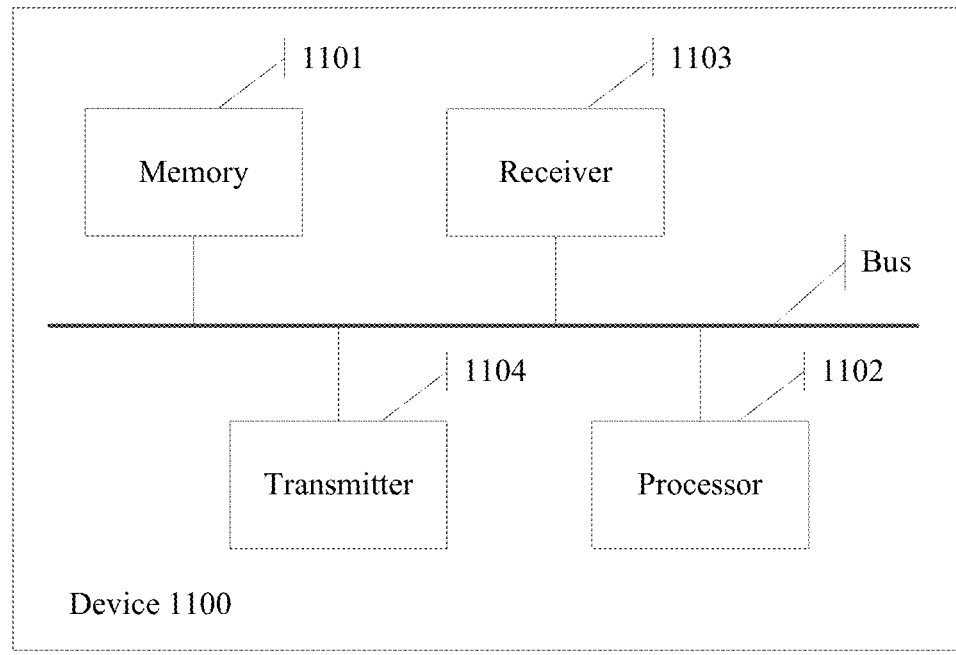

Optionally, as shown in FIG. 11B, the apparatus further includes a transmitter 1104. The processor is configured to:

after the deployment process of the edge VNFC is completed, receive, by using the receiver 1003, a second request message that is sent by the VNFM and that is used to migrate the virtual machine or the container of the edge VNFC, where the second request message carries second location information of the user terminal; determine a target edge server based on the second location information; and send, to the edge server and the target edge server by using the transmitter 1104, indication information that is used to migrate the virtual machine or the container of the edge VNFC, to complete a migration process of the edge VNFC.

There may be one or more memories 1101. The memory 1101 may be a ROM, a RAM, or a magnetic disk storage.

The receiver 1103 may be configured to communicate with an external device. For example, the receiver 1103 may communicate with the VNFM.

The transmitter 1104 may be configured to communicate with an external device. For example, the transmitter 1104 may communicate with a central server and the edge server on which the network function is deployed.

The transmitter 1104 and the receiver 1103 may be a same entity module, for example, may be an entity module that can implement transmitting and receiving functions. For example, the entity module may be referred to as a transceiver. Alternatively, the transmitter 1104 and the receiver 1103 may be separate entity modules.

The memory 1101, the transmitter 1104, and the receiver 1103 may be connected to the processor 1102 by using a bus, or may be separately connected to the processor 1102 by using a dedicated connection cable.

The memory 1101, the receiver 1103, and the transmitter 1104 may be connected to the processor 1102 by using a bus, or may be separately connected to the processor 1102 by using a dedicated connection cable.

Code corresponding to a method shown above is built into a chip by designing and programming the processor 1102, so that when running, the chip can perform the methods shown in FIG. 4 and FIG. 5. How to design and program the processor 1102 is a technology well known to persons skilled in the art. Details are not described herein.

Figure 12:
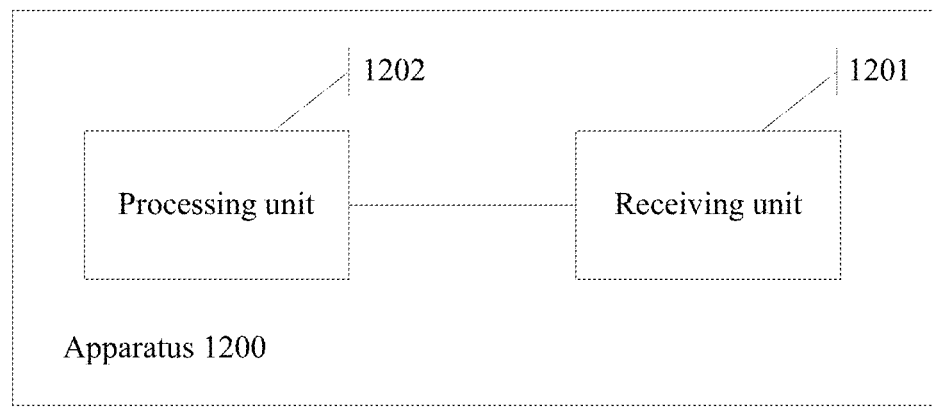
FIG. 12 is a schematic structural diagram of yet another apparatus for deploying a virtualized network function using network edge computing according to an embodiment of the present invention.

Based on the method for deploying a virtualized network function provided in the foregoing embodiment, an embodiment of the present invention provides an apparatus 1200 for deploying a network function. The apparatus may be configured to execute an execution process of a target edge server in the method described in FIG. 5. FIG. 12 is a schematic structural diagram of the apparatus 1200 according to this embodiment of the present invention. As shown in FIG. 12, the apparatus 1200 includes a receiving unit 1201 and a processing unit 1202.

The receiving unit 1201 is configured to receive indication information that is sent by a VIM and that is for migrating a virtual machine or a container of an edge VNFC from an original edge server to a target edge server.

The receiving unit 1201 is further configured to receive the virtual machine or the container of the edge VNFC that is sent by the original edge server.

The processing unit 1202 is configured to provide a business service of the virtualized network function for the user terminal by using the virtual machine or the container of the edge VNFC.

The apparatus 1200 related in this embodiment of the present invention may be an independent component, or may be integrated into another component.

It should be noted that, for function implementation and an interaction manner of each unit of the apparatus 1200 in this embodiment of the present invention, further refer to descriptions in a related method embodiment. Details are not described herein.

Figure 13:
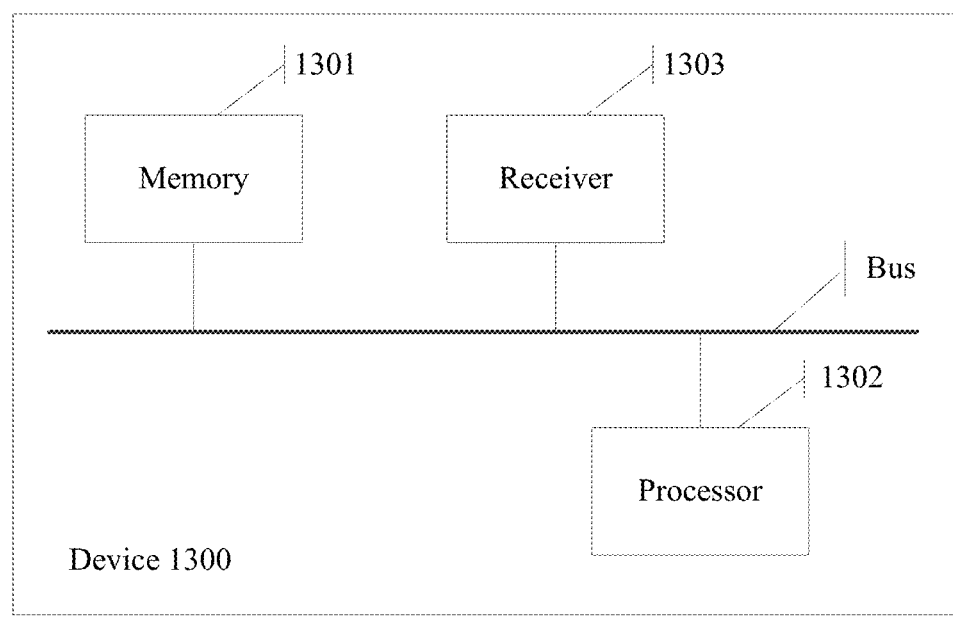
FIG. 13 is a schematic structural diagram of yet another device for deploying a virtualized network function using network edge computing according to an embodiment of the present invention.

Referring to FIG. 13, based on a same invention concept, an embodiment of the present invention further provides a device 1300 for deploying a network function. The device 1300 may be configured to execute an execution process of a target edge server in the method described in FIG. 5. As shown in FIG. 13, the device 1300 includes a memory 1301, a processor 1302, and a receiver 1303. Program code that executes the solution of the present invention is stored in the memory 1301, and the processor 1302 controls the execution.

A program stored in the memory 1301 is used to instruct the processor 1302 to execute a method for deploying a network function, including: receiving, by using the receiver 1303, indication information that is sent by a VIM and that is for migrating a virtual machine or a container of an edge VNFC from an original edge server to a target edge server; receiving the virtual machine or the container of the edge VNFC that is sent by the original edge server; and providing a business service of the virtualized network function for the user terminal by using the virtual machine or the container of the edge VNFC.

The processor 1302 may be a CPU or a specific ASIC, may be one or more integrated circuits configured to control program execution, may be a hardware circuit developed by using an FPGA, or may be a baseband chip.

There may be one or more memories 1301. The memory 1301 may be a ROM, a RAM, or a magnetic disk storage.

The receiver 1303 may be configured to communicate with an external device. For example, the receiver 1303 may communicate with the VIM.

The memory 1301 and the receiver 1303 may be connected to the processor 1302 by using a bus, or may be separately connected to the processor 1302 by using a dedicated connection cable.

Code corresponding to a method shown above is built into a chip by designing and programming the processor 1302, so that when running, the chip can perform the method shown in FIG. 5. How to design and program the processor 1302 is a technology well known to persons skilled in the art. Details are not described herein.

It may be understood that the device 1300 in this embodiment may be configured to implement all functions of the target edge server related in the foregoing method embodiment. For a specific implementation process, refer to related descriptions of the foregoing method embodiment. Details are not described herein.

Based on the foregoing embodiment, an embodiment of the present invention further provides a system for deploying a virtualized network function using network edge computing. The virtualized network function is completed by using a central virtualized network function component VNFC and an edge VNFC. The system includes the central VNFC, a VNFM, and a VIM. The central VNFC is deployed in the apparatus shown in FIG. 6 or the device shown in FIG. 7, the VNFM is the apparatus shown in FIG. 8 or the device shown in FIG. 9, and the VIM is the apparatus shown in FIG. 10A or FIG. 10B. Details are as follows.

The central VNFC is configured to: receive first location information sent by a user terminal, and send, to the virtualized network function manager VNFM, a creation request message that is used to create the edge VNFC, where the creation first request message carries the first location information.

The VNFM is configured to: receive the creation request message that is sent by the central VNFC and that is used to create the edge VNFC, and send, to the VIM, a first request message that is used to create a virtual machine or a container of the edge VNFC, where the first request message carries the first location information of the user terminal and a mirror of the edge VNFC.

The VIM is configured to: receive the first request message that is sent by the VNFM and that is used to create the virtual machine or the container of the edge VNFC, where the first request message carries the first location information of the user terminal and the mirror of the edge VNFC; and determine an edge server based on the first location information, and deploy the edge VNFC on the edge server based on the mirror of the edge VNFC, to complete a deployment process of the edge VNFC.

In conclusion, in this embodiment of the present invention, after receiving the first location information sent by the user terminal, the central VNFC sends, to the VNFM, the creation request message that is used to create the edge VNFC, where the creation first request message carries the first location information. After receiving the creation request message, the VNFM sends, to the VIM, the first request message that is used to create the virtual machine or the container of the edge VNFC, where the first request message carries the first location information and the mirror of the edge VNFC. The VIM determines the edge server based on the first location information, and deploys the edge VNFC on the edge server based on the mirror of the edge VNFC, to complete the deployment process of the edge VNFC. In this way, it can be implemented that a deployment location of the edge VNFC is proximate to a user in a NEC scenario, reducing a service delay, improving quality of service of a business, and reducing an internal bandwidth requirement of a network.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

What is claimed is:

1. A method for deploying a virtualized network function using network edge computing, comprising:
   receiving, by a central virtualized network function component (VNFC), first location information transmitted from a user terminal;
   sending, by the central VNFC to a virtualized network function manager (VNFM), a creation request message used to create an edge VNFC and carrying the first location information received from the user terminal, to execute a deployment process of the edge VNFC;
   determining an edge component based on the first location information received from the user terminal; and
   deploying the edge VNFC on the edge component, wherein
   the virtualized network function is completed by using the central VNFC and the edge VNFC,
   the edge VNFC is configured based on the first location information,
   a resource requirement of the edge VNFC is described using a virtualization deployment unit (VDU) in a virtualized network function descriptor (VNFD) having a first member field, and the first member field of the VNFD includes an identifier range used to identify a plurality of edge VNFCs within identifier range.

2. The method according to claim 1, wherein after sending the creation request message, the method further comprises:
receiving, by the central VNFC from the deployed edge VNFC, a service registration request message; and
sending, by the central VNFC, service configuration information and user terminal information to the edge VNFC, and providing a service of the virtualized network function for the user terminal by using the edge VNFC.

3. The method according to claim 2, wherein after sending the service configuration information and user terminal information to the edge VNFC, the method further comprises:
when location information of the user terminal changes, receiving, by the central VNFC from the user terminal, second location information; and
sending, by the central VNFC to the VNFM, a migration request message used to migrate the edge VNFC, to execute a migration process of the edge VNFC, wherein the migration request message carries the second location information.

4. The method according to claim 1, wherein the first location information is received from the user terminal using a service layer protocol message.

5. The method according to claim 1, wherein the creation request message carries the first location information of the user terminal and a mirror of the edge VNFC.

6. The method according to claim 5, wherein the edge VNFC is deployed on the edge component based on the mirror of the edge VNFC.

7. The method according to claim 1, wherein the VNFM sends the creation request message to a virtualized infrastructure manager (VIM) to create a virtual machine (VM) or a container of the edge VNFC.

8. The method according to claim 7, wherein an edge location information parameter is added to a creation interface of the VIM indicating location information of the edge VNFC.

9. A method for deploying a virtualized network function using network edge computing, comprising:
receiving, by a virtualized network function manager (VNFM), a creation request message used to create an edge virtualized network function component (VNFC), wherein the creation request message is received from a central VNFC and the creation request message carries first location information received from a user terminal;
sending, by the VNFM to a virtualized infrastructure manager (VIM), a first request message used to create a virtual machine or a container of the edge VNFC;
determining, by the VIM, an edge component based on the first location information received from the user terminal; and
deploying, by the VIM, the edge VNFC on the edge component,
wherein the first request message carries the first location information of the user terminal and a mirror of the edge VNFC, and
wherein the virtualized network function is completed by using the central VNFC and the edge VNFC, and the edge VNFC is configured based on the first location information.

10. The method according to claim 9, wherein after the VIM executes the deployment process of the edge VNFC, the method further comprises:
receiving, by the VNFM from the central VNFC, a migration request message used to migrate the edge VNFC, wherein the migration request message carries second location information of the user terminal; and
sending, by the VNFM to the VIM, a second request message used to migrate the virtual machine or the container of the edge VNFC, wherein the second request message carries the second location information of the user terminal, and a migration process of the edge VNFC is executed by using the VIM.

11. The method according to claim 9, wherein a resource requirement of the edge VNFC is described using a virtualization deployment unit (VDU) in a virtualized network function descriptor (VNFD) having a first member field.

12. The method according to claim 11, wherein the first member field of the VNFD includes an identifier range used to identify a plurality of edge VNFCs within identifier range.

13. A system configured to deploy a virtualized network function using network edge computing, the system comprising:
a central virtualized network function component (VNFC);
an edge VNFC;
a virtualized network function manager (VNFM); and
a virtualized infrastructure manager (VIM), wherein
the central VNFC is configured to:
receive first location information transmitted from a user terminal, and
send, to the VNFM, a creation request message used to create the edge VNFC, wherein the creation request message carries the first location information;
the VNFM is configured to:
receive the creation request message from the central VNFC, and
send, to the VIM, a first request message used to create a virtual machine or a container of the edge VNFC, wherein the first request message carries the first location information of the user terminal and a mirror of the edge VNFC; and
the VIM is configured to:
receive the first request message sent by the VNFM and used to create the virtual machine or the container of the edge VNFC, wherein the first request message carries the first location information of the user terminal and the mirror of the edge VNFC;
determine an edge server based on the first location information received from the user terminal; and
deploy the edge VNFC on the edge server based on the mirror of the edge VNFC, wherein
the virtualized network function is completed by using the central VNFC and the edge VNFC.

14. An apparatus configured to deploy a virtualized network function using network edge computing, the apparatus comprising:
a transceiver;
one or more processors; and
a memory configured to store a program that, when executed by the one or more processors,
cause the apparatus to provide execution comprising:
receiving first location information transmitted from a user terminal;
sending, to a virtualized network function manager (VNFM), a creation request message used to create an edge virtualized network function component (VNFC) and carrying the first location information received from the user terminal, to execute a deployment process of the edge VNFC;

determining an edge component based on the first location information received from the user terminal; and deploying the edge VNFC on the edge component, wherein the virtualized network function is completed by using a central VNFC and the edge VNFC, and the edge VNFC is configured based on the first location information.

15. The apparatus according to claim 14, wherein the apparatus is further caused to provide execution comprising:

receiving a service registration request message from the deployed edge VNFC, wherein the edge VNFC is configured based on the first location information; and sending service configuration information and user terminal information to the edge VNFC, and providing a service of the virtualized network function for the user terminal by using the edge VNFC.

16. The apparatus according to claim 15, wherein the apparatus is further caused to provide execution comprising:

when location information of the user terminal changes, receiving second location information from the user terminal; and sending, to the VNFM, a migration request message used to migrate the edge VNFC, to execute a migration process of the edge VNFC, wherein the migration request message carries the second location information.

* * * * *